United States Patent
Buss et al.

(10) Patent No.: US 11,976,144 B2
(45) Date of Patent: *May 7, 2024

(54) MULTISTAGE POLYMER

(71) Applicants: Dow Global Technologies LLC, Midland, MI (US); Rohm and Haas Company, Collegeville, PA (US); Dow Silicones Corporation, Midland, MI (US)

(72) Inventors: Hilda G. Buss, Norristown, PA (US); Fanwen Zeng, Audubon, PA (US); Bryan L. McCulloch, Olympia, WA (US); Jodi Mecca, Midland, MI (US); Ralph C. Even, Blue Bell, PA (US); Michaeleen L. Pacholski, Collegeville, PA (US)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 467 days.

This patent is subject to a terminal disclaimer.

(21) Appl. No.: 17/294,585

(22) PCT Filed: Dec. 3, 2019

(86) PCT No.: PCT/US2019/064156
§ 371 (c)(1),
(2) Date: May 17, 2021

(87) PCT Pub. No.: WO2020/123196
PCT Pub. Date: Jun. 18, 2020

(65) Prior Publication Data
US 2021/0403610 A1     Dec. 30, 2021

Related U.S. Application Data

(60) Provisional application No. 62/778,528, filed on Dec. 12, 2018.

(51) Int. Cl.
| | |
|---|---|
| *C08F 220/06* | (2006.01) |
| *C08F 2/00* | (2006.01) |
| *C08F 220/14* | (2006.01) |
| *C08F 220/18* | (2006.01) |
| *C08F 220/40* | (2006.01) |
| *C08F 230/08* | (2006.01) |
| *C08F 265/06* | (2006.01) |

(52) U.S. Cl.
CPC ............ *C08F 2/001* (2013.01); *C08F 220/06* (2013.01); *C08F 220/14* (2013.01); *C08F 220/1804* (2020.02); *C08F 220/1808* (2020.02); *C08F 220/40* (2013.01); *C08F 230/08* (2013.01); *C08F 265/06* (2013.01)

(58) Field of Classification Search
CPC ...... C08F 2/001; C08F 220/06; C08F 220/14; C08F 220/1804; C08F 220/1808; C08F 220/40; C08F 230/08; C08F 265/06
USPC ........................................................ 524/806
See application file for complete search history.

(56) References Cited

U.S. PATENT DOCUMENTS

| | | |
|---|---|---|
| 4,988,788 A | 1/1991 | Takarada |
| 6,403,074 B1 | 6/2002 | Blankenburg et al. |
| 6,534,590 B1 | 3/2003 | Aso et al. |
| 7,067,499 B2 | 6/2006 | Erazo-Majewicz et al. |
| 2006/0182703 A1 | 8/2006 | Arisz |
| 2007/0202069 A1 | 8/2007 | Tamareselvy et al. |
| 2017/0260393 A1 | 9/2017 | Phukan et al. |
| 2021/0353524 A1* | 11/2021 | Zeng .................. A61Q 1/02 |
| 2021/0401725 A1* | 12/2021 | Zeng .................. A61K 8/37 |
| 2023/0285268 A1* | 9/2023 | Lan .................. A61K 8/894 424/68 |

OTHER PUBLICATIONS

Zhang., "A novel approach for the preparation of organic-siloxane oligomers and the creation of hydropobic surface." 2007, p. 452-458, vol. 254, No. 2.

* cited by examiner

*Primary Examiner* — Hannah J Pak
(74) *Attorney, Agent, or Firm* — Thomas S. Deibert

(57) ABSTRACT

A multistage polymer is provided, comprising: acrylate rich stage comprising: (a) structural units of monoethylenically unsaturated non-ionic, acrylate rich stage monomer selected from $C_{1-22}$ alkyl (meth)acrylates and mixtures thereof; and (b) carbosiloxane rich stage, comprising: structural units of carbosiloxane monomer of formula (I), wherein a is 0 to 3; wherein d is 0 or 1; wherein $R^1$ is selected from hydrogen, $C_{1-10}$ alkyl group and aryl group; wherein $R^2$ is selected from hydrogen and $C_{1-10}$ alkyl group; wherein $R^8$ is —O—Si(CH$_3$)$_2$—O—Si(CH$_3$)$_3$ group; wherein Y is selected from formula (II), (III) and (IV); wherein $R^4$ and $R^6$ are selected from hydrogen and methyl group; wherein $R^3$ and $R^5$ are a $C_{1-10}$ alkylene group; wherein $R^7$ is $C_{1-10}$ alkyl group; wherein b is 0 to 4 and wherein c is 0 or 1.

10 Claims, No Drawings

MULTISTAGE POLYMER

The present invention relates to a multistage polymer. In particular, the present invention relates to a multistage polymer, comprising: an acrylate rich stage comprising: (a) structural units of monoethylenically unsaturated non-ionic, acrylate rich stage monomer selected from $C_{1-22}$ alkyl (meth)acrylates and mixtures thereof; and (b) a carbosiloxane rich stage, comprising: structural units of carbosiloxane monomer of formula (I), wherein a is 0 to 3; wherein d is 0 or 1; wherein $R^1$ is selected from hydrogen, $C_{1-10}$ alkyl group and aryl group; wherein $R^2$ is selected from hydrogen and $C_{1-10}$ alkyl group; wherein $R^8$ is —O—Si(CH$_3$)$_2$—O—Si(CH$_3$)$_3$ group; wherein Y is selected from formula (II), (III) and (IV); wherein $R^4$ and $R^6$ are selected from hydrogen and methyl group; wherein $R^3$ and $R^5$ are a $C_{1-10}$ alkylene group; wherein $R^7$ is $C_{1-10}$ alkyl group; wherein b is 0 to 4 and wherein c is 0 or 1.

Silicone containing polymers have been proposed for and used in coatings, personal care, and home care industries. In coatings formulations, silicone containing polymers offer the potential for general modification of surface properties as these polymers may impart water and oil repellency, stain resistance, barrier properties, surfactant properties and lubricity to the formulated coating. In personal care formulations, silicone containing polymers offer performance improvements and desirable sensory properties for the formulated product.

Attempts to design silicone containing polymers and to incorporate the same into formulated products; however, have been met with significant challenges. The silicone containing polymers are frequently incompatible with other ingredients of the formulated products, such as, polar polymers and other ingredients typically contained in coating formulations and home and personal care compositions. Hence, auxiliary additives are typically employed to compatibilize the silicone containing polymer with the other components in the formulated product to impede phase separation of the key components during storage.

An approach to providing silicone containing polymers that provide improved compatibility for cosmetic formulations is disclosed by Blankenburg et al. in U.S. Pat. No. 6,403,074. In U.S. Pat. No. 6,403,074, Blankenburg et al. disclose a water-soluble or water-dispersible polymer which is obtained by subjecting (a) ethylenically unsaturated monomers to free-radical polymerization in the presence of (b) polyalkylene oxide-containing silicone derivatives of the formula

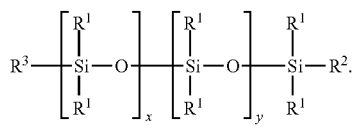

Notwithstanding, there remains a need for new silicone containing polymers that provide formulational design flexibility and compatibilization for use in a variety of coating formulations, personal care formulations and home care formulations.

The present invention provides a multistage polymer, comprising: (a) an acrylate rich stage comprising: 88 to 100 wt %, based on weight of the acrylate rich stage, of structural units of a monoethylenically unsaturated non-ionic, acrylate rich stage monomer, wherein the monoethylenically unsaturated non-ionic, acrylate rich stage monomer is selected from the group consisting of $C_{1-22}$ alkyl (meth)acrylates and mixtures thereof; 0 to 10 wt %, based on weight of the acrylate rich stage, of structural units of a monoethylenically unsaturated carboxylic acid, acrylate rich stage monomer; and 0 to 2 wt %, based on weight of the acrylate rich stage, of structural units of a multiethylenically unsaturated, acrylate rich stage monomer having at least two ethylenically unsaturated groups per molecule; and (b) a carbosiloxane rich stage, comprising: 0 to 90 wt %, based on weight of the carbosiloxane rich stage, of structural units of a vinyl monomer; and 10 to 100 wt %, based on weight of the carbosiloxane rich stage, of structural units of a carbosiloxane monomer of formula (I)

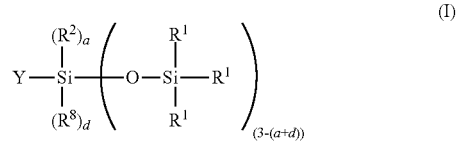

wherein a is 0 to 3; wherein d is 0 or 1; wherein each $R^1$ is independently selected from the group consisting of a hydrogen, a $C_{1-10}$ alkyl group and an aryl group; wherein each $R^2$ is independently selected from the group consisting of a hydrogen and a $C_{1-10}$ alkyl group; wherein each $R^8$ is a —O—Si(CH$_3$)$_2$—O—Si(CH$_3$)$_3$ group; wherein Y is selected from the group consisting of formula (II), (III) and (IV)

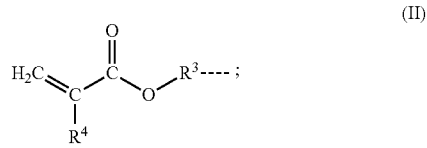

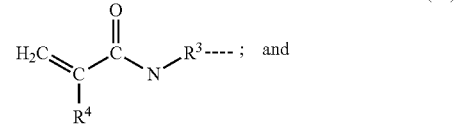

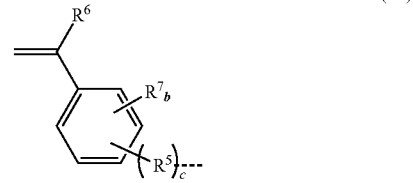

wherein each $R^4$ and $R^6$ are independently selected from the group consisting of a hydrogen and a methyl group; wherein each $R^3$ and $R^5$ are independently a $C_{1-10}$ alkylene group; wherein each $R^7$ is independently a $C_{1-10}$ alkyl group; wherein b is 0 to 4 and wherein c is 0 or 1.

The present invention provides a composition, comprising a multistage polymer of the present invention, wherein the composition is selected from the group consisting of a personal care formulation, a home care formulation, a coating, an oilfield servicing fluid, a civil engineering servicing fluid, a construction formulation and a pharmaceutical formulation.

DETAILED DESCRIPTION

We have identified a unique multistage polymer for use in a variety of compositions, wherein the desirable properties imparted via incorporation of silicone containing polymer can be tailored to facilitate compatibilization with the other components in such compositions.

Unless otherwise indicated, ratios, percentages, parts, and the like are by weight.

The term "aesthetic characteristics" as used herein and in the appended claims in reference to a personal care formulation refers to visual and tactile sensory properties (e.g., smoothness, tack, lubricity, texture, color, clarity, tubridity, uniformity).

The term "structural units" as used herein and in the appended claims refers to the remnant of the indicated monomer in the claimed polymer; thus a structural unit of n-butyl acrylate is illustrated:

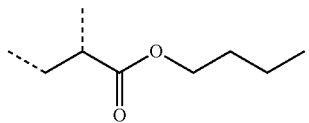

where the dotted lines represent the points of attachment to the polymer backbone.

The term "(meth)acrylic acid" as used herein and in the appended claims is intended to serve as a generic expression embracing both acrylic acid and methacrylic acid.

The term "(meth)acrylate" as used herein and in the appended claims is intended to serve as a generic expression embracing both acrylate and methacrylate.

The term "cosmetically acceptable" as used herein and in the appended refers to ingredients that are typically used for topical application to the skin, and is intended to underscore that materials that are toxic when present in the amounts typically found in skin care compositions are not contemplated as part of the present invention.

Preferably, the multistage polymer of the present invention, comprises: (a) (preferably, 60 to 95 wt % (more preferably, 65 to 90 wt %; still more preferably, 70 to 85 wt %; most preferably, 75 to 82 wt %), based on weight of the multistage polymer, of) an acrylate rich stage comprising: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer, wherein the monoethylenically unsaturated non-ionic, acrylate rich stage monomer is selected from the group consisting of $C_{1-22}$ alkyl (meth)acrylates and mixtures thereof; 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; and 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; and (b) (preferably, 5 to 40 wt % (more preferably, 10 to 35 wt %; still more preferably, 15 to 30 wt %; most preferably, 18 to 25 wt %), based on weight of the multistage polymer, of) a carbosiloxane rich stage, comprising: 0 to 90 wt % (preferably, 10 to 50 wt %; more preferably, 12.5 to 30 wt %; still more preferably, 15 to 25 wt %; most preferably, 19 to 21 wt %), based on weight of the carbosiloxane rich stage, of structural units of a vinyl monomer; and 10 to 100 wt % (preferably, 50 to 90 wt %; more preferably, 70 to 87.5 wt %; still more preferably, 75 to 85 wt %; most preferably, 79 to 81 wt %), based on weight of the carbosiloxane rich stage, of structural units of a carbosiloxane monomer of formula (I)

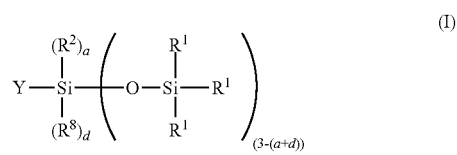

wherein a is 0 to 3 (preferably, 0 to 2; most preferably, 1); wherein d is 0 or 1 (preferably, 0); wherein each $R^1$ is independently selected from the group consisting of a hydrogen, a $C_{1-10}$ alkyl group and an aryl group (preferably, a hydrogen and a $C_{1-10}$ alkyl group; more preferably, a hydrogen and a $C_{1-4}$ alkyl group; still more preferably, a hydrogen and a methyl group; most preferably, a methyl group); wherein each $R^2$ is independently selected from the group consisting of a hydrogen and a $C_{1-10}$ alkyl group (preferably, a hydrogen and a $C_{1-5}$ alkyl group; more preferably, a hydrogen and a $C_{1-4}$ alkyl group; still more preferably, a hydrogen and a methyl group; most preferably, a methyl group); wherein each $R^8$ is a $-O-Si(CH_3)_2-O-Si(CH_3)_3$ group; wherein Y is selected from the group consisting of formula (II), (III) and (IV) (preferably, (II) or (III); most preferably, (II))

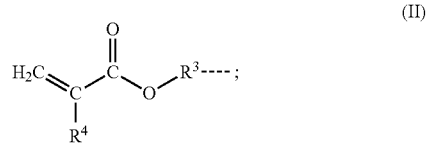

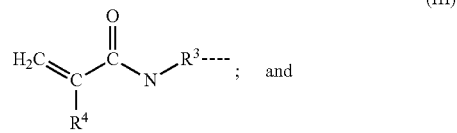

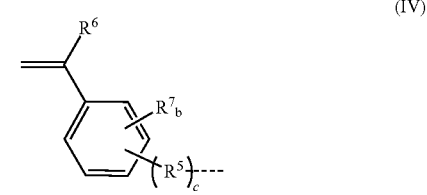

wherein each $R^4$ and $R^6$ are independently selected from the group consisting of a hydrogen and a methyl group (preferably, a methyl group); wherein each $R^3$ and $R^5$ are independently a $C_{1-10}$ alkylene group (preferably, a $C_{1-7}$ alkylene group; more preferably, a $C_{2-6}$ alkylene group; still more preferably, a $C_{3-5}$ alkylene group; most preferably, a C3 alkylene group); wherein each $R^7$ is independently a $C_{1-10}$ alkyl group; wherein b is 0 to 4 and wherein c is 0 or 1.

Preferably, the multistage polymer of the present invention comprises an acrylate rich stage. More preferably, the multistage polymer of the present invention, comprises: 60 to 95 wt % (preferably, 65 to 90 wt %; more preferably, 70 to 85 wt %; most preferably, 75 to 82 wt %), based on weight of the multistage polymer, of an acrylate rich stage. Most preferably, the multistage polymer of the present invention, comprises 60 to 95 wt % (preferably, 65 to 90 wt %; more preferably, 70 to 85 wt %; most preferably, 75 to 82 wt %), based on weight of the multistage polymer, of an acrylate rich stage; wherein the acrylate rich stage, comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of $C_{1-22}$ alkyl (meth)acrylates and mixtures thereof; 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; and 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule.

Preferably, the acrylate rich stage comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of $C_{1-22}$ alkyl (meth)acrylates and mixtures thereof. More preferably, the acrylate rich stage comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of at least two $C_{1-12}$ alkyl (meth)acrylates. Still more preferably, the acrylate rich stage comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of at least two $C_{1-8}$ alkyl (meth)acrylates. Yet more preferably, the acrylate rich stage comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of at least three $C_{1-8}$ alkyl (meth)acrylates.

Preferably, the acrylate rich stage comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of (i) 40 to 75 wt % (more preferably, 50 to 70 wt %; most preferably, 55 to 65 wt %), based on weight of the acrylate rich stage, of at least one $C_{1-5}$ alkyl (meth)acrylate and (ii) 25 to 60 wt % (more preferably, 30 to 50 wt %; most preferably, 35 to 45 wt %), based on weight of the acrylate rich stage, of at least one $C_{6-22}$ alkyl (meth)acrylate. More preferably, the acrylate rich stage comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of (i) 40 to 75 wt % (more preferably, 50 to 70 wt %; most preferably, 55 to 65 wt %), based on weight of the acrylate rich stage, of at least one $C_{1-4}$ alkyl (meth)acrylate selected from the group consisting of butyl (meth)acrylate, isobutyl (meth)acrylate, methyl (meth)acrylate and mixtures thereof; and (ii) 25 to 60 wt % (more preferably, 30 to 50 wt %; most preferably, 35 to 45 wt %), based on weight of the acrylate rich stage, of at least one $C_{6-22}$ alkyl (meth)acrylate selected from the group consisting of ethylhexyl (meth)acrylate, lauryl (meth)acrylate, stearyl (meth)acrylate, cetyl-eicosyl (meth)acrylate, behenyl (meth)acrylate and mixtures thereof. Still more preferably, the acrylate rich stage comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of (i) 40 to 75 wt % (more preferably, 50 to 70 wt %; most preferably, 55 to 65 wt %), based on weight of the acrylate rich stage, of at least one $C_{1-4}$ alkyl (meth)acrylate selected from the group consisting of butyl acrylate, butyl methacrylate, butyl methacrylate isobutyl methacrylate, methyl methacrylate and mixtures thereof; and (ii) 25 to 60 wt % (more preferably, 30 to 50 wt %; most preferably, 35 to 45 wt %), based on weight of the acrylate rich stage, of at least one $C_{6-22}$ alkyl (meth)acrylate selected from the group consisting of ethylhexyl (meth)acrylate, lauryl (meth)acrylate, stearyl (meth)acrylate and mixtures thereof. Most preferably, the acrylate rich stage comprises: 88 to 100 wt % (preferably, 94 to 99.49 wt %; more preferably, 97 to 99.23 wt %; still more preferably, 97.9 to 98.95 wt %; most preferably, 97.45 to 98.05 wt %), based on weight of the acrylate rich stage, of structural units of a monoethylenically unsaturated non-ionic, acrylate rich stage monomer; wherein the monoethylenically unsaturated non-ionic, acrylate rich stage monomer is selected from the group consisting of a mixture of (i) 40 to 75 wt % (more preferably, 50 to 70 wt %; most preferably, 55 to 65 wt %), based on weight of the acrylate rich stage, of at least one $C_{1-4}$ alkyl (meth)acrylate selected from the group consisting of butyl acrylate, butyl methacrylate isobutyl methacrylate, methyl methacrylate and mixtures thereof; and (ii) 25 to 60 wt % (more preferably, 30 to 50 wt %; most preferably, 35 to 45 wt %), based on weight of the acrylate rich stage, of at least one $C_{6-22}$ alkyl (meth)acrylate selected from the group consisting of ethylhexyl acrylate, ethylhexyl methacrylate and mixtures thereof.

Preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer. More preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; wherein the monoethylenically unsaturated carboxylic acid, acrylate rich stage monomer is selected from the group consisting of (meth)acrylic acid, (meth)acryloxypropionic acid, itaconic acid, aconitic acid, maleic acid, maleic anhydride, fumaric acid, crotonic acid, citraconic acid, maleic anhydride, monomethyl maleate, monomethyl fumarate, monomethyl itaconate, other derivatives (such as corresponding anhydride, amides and esters) and mixtures thereof. Still more preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; wherein the monoethylenically unsaturated carboxylic acid, acrylate rich stage monomer is selected from the group consisting of acrylic acid, methacrylic acid, itaconic acid, crotonic acid and mixtures thereof. Yet more preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; wherein the monoethylenically unsaturated carboxylic acid, acrylate rich stage monomer is selected from the group consisting of at least one of acrylic acid and methacrylic acid. Most preferably, the acrylate rich stage comprises: 0 to 10 wt % (preferably, 0.5 to 5 wt %; more preferably, 0.75 to 2.5 wt %; still more preferably, 1 to 2 wt %; most preferably, 1.25 to 1.75 wt %), based on weight of the acrylate rich stage, of structural units of a monoethylenically unsaturated carboxylic acid, acrylate rich stage monomer; wherein the monoethylenically unsaturated carboxylic acid, acrylate rich stage monomer is methacrylic acid.

Preferably, the acrylate rich stage comprises: 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule. More preferably, the acrylate rich stage comprises: 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule is selected from the group consisting of divinylaromatic compounds, di-(meth)acrylate esters, tri-(meth)acrylate esters, tetra-(methacrylate)esters, di-allyl ethers, tri-allyl ethers, tetra-allyl ethers, di-allyl esters, tri-allyl esters, tetra-allyl esters, allyl (meth)acrylate and mixtures thereof. Still more preferably, the acrylate rich stage comprises: 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule is selected from the group consisting of divinylbenzene (DVB), trimethylolpropane diallyl ether, tetra-allyl pentaerythritol, triallyl pentaerythritol, diallyl pentaerythritol, diallyl phthalate, diallyl maleate, triallyl cyanurate, Bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA), butylene glycol dimethacrylate (BGDMA) and mixtures thereof. Yet more preferably, the acrylate rich stage comprises: 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule is selected from the group consisting of DVB, ALMA, EGDMA, HDDA and BGDMA. Yet still more preferably, the acrylate rich stage comprises: 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule includes ALMA. Most preferably, the acrylate rich stage comprises: 0 to 2 wt % (preferably, 0.01 to 1 wt %; more preferably, 0.02 to 0.5 wt %; still more preferably, 0.05 to 0.1 wt %; most preferably, 0.07 to 0.08 wt %), based on weight of the acrylate rich stage, of structural units of a multiethylenically unsaturated, acrylate rich stage monomer having at least two ethylenically unsaturated groups per molecule; wherein the multiethylenically unsaturated monomer having at least two ethylenically unsaturated groups per molecule is ALMA.

Preferably, the multistage polymer of the present invention comprises an carbosiloxane rich stage. More preferably, the multistage polymer of the present invention, comprises: 5 to 40 wt % (preferably, 10 to 35 wt %; more preferably, 15 to 30 wt %; most preferably, 18 to 25 wt %), based on weight of the multistage polymer, of a carbosiloxane rich stage. Most preferably, the multistage polymer of the present invention, comprises: 5 to 40 wt % (preferably, 10 to 35 wt %; more preferably, 15 to 30 wt %; most preferably, 18 to 25 wt %), based on weight of the multistage polymer, of a carbosiloxane rich stage; wherein the carbosiloxane rich stage comprises: 0 to 90 wt % (preferably, 10 to 50 wt %; more preferably, 12.5 to 30 wt %; still more preferably, 15 to 25 wt %; most preferably, 19 to 21 wt %), based on weight of the carbosiloxane rich stage, of structural units of a vinyl monomer; and 10 to 100 wt % (preferably, 50 to 90 wt %; more preferably, 70 to 87.5 wt %; still more preferably, 75 to 85 wt %; most preferably, 79 to 81 wt %), based on weight of the carbosiloxane rich stage, of structural units of a carbosiloxane monomer of formula (I).

Preferably, the carbosiloxane rich stage comprises: 0 to 90 wt % (preferably, 10 to 50 wt %; more preferably, 12.5 to 30 wt %; still more preferably, 15 to 25 wt %; most preferably, 19 to 21 wt %), based on weight of the carbosiloxane rich stage, of structural units of a vinyl monomer. More preferably, the carbosiloxane rich stage comprises: 0 to 90 wt % (preferably, 10 to 50 wt %; more preferably, 12.5 to 30 wt %; still more preferably, 15 to 25 wt %; most preferably, 19 to 21 wt %), based on weight of the carbosiloxane rich stage, of structural units of a vinyl monomer; wherein the vinyl monomer contains at least one radically polymerizable vinyl group per molecule. Still more preferably, the carbosiloxane rich stage comprises: 0 to 90 wt % (preferably, 10 to 50 wt %; more preferably, 12.5 to 30 wt %; still more preferably, 15 to 25 wt %; most preferably, 19 to 21 wt %), based on weight of the carbosiloxane rich stage, of structural units of a vinyl monomer; wherein the vinyl monomer is selected from the group consisting of $C_{1-3}$ alkyl acrylates (e.g., methyl acrylate, ethyl acrylate, n-propyl acrylate, isopropyl acrylate); $C_{1-3}$ alkyl methacrylates (e.g., methyl methacrylate, ethyl methacrylate, n-propyl methacrylate, isopropyl methacrylate); monoethylenically unsaturated carboxylic acids (e.g., (meth)acrylic acid, (meth)acryloxypropionic acid, itaconic acid, aconitic acid, maleic acid, maleic anhydride, fumaric acid, crotonic acid, citraconic acid, maleic anhydride, monomethyl maleate, monomethyl fumarate, monomethyl itaconate); $C_{4-20}$ alkyl acrylates (e.g., n-butyl acrylate, isobutyl acrylate, tert-butyl acrylate, n-hexyl acrylate, cyclohexyl acrylate, 2-ethylhexyl acrylate, octyl acrylate, lauryl acrylate, stearyl acrylate); $C_{4-20}$ alkyl methacrylates (e.g., n-butyl methacrylate, isobutyl methacrylate, tert-butyl methacrylate, n-hexyl methacrylate, cyclohexyl methacrylate, 2-ethylhexyl methacrylate, octyl methacrylate, lauryl methacrylate, stearyl methacrylate); aromatic vinyl monomers (e.g., styrene, vinyl toluene, benzyl acrylate, benzyl methacrylate, phenoxyethyl acrylate, phenoxyethyl methacrylate, vinyl pyrrolidone); and mixtures thereof. Yet more preferably, the carbosiloxane rich stage comprises: 0 to 90 wt % (preferably, 10 to 50 wt %; more preferably, 12.5 to 30 wt %; still more preferably, 15 to 25 wt %; most preferably, 19 to 21 wt %), based on weight of the carbosiloxane rich stage, of structural units of a vinyl monomer; wherein the vinyl monomer is selected from the group consisting of methyl acrylate, ethyl acrylate, n-propyl acrylate, isopropyl acrylate, methyl methacrylate, ethyl methacrylate, n-propyl methacrylate, isopropyl methacrylate, n-butyl acrylate, isobutyl acrylate, tert-butyl acrylate, n-hexyl acrylate, cyclohexyl acrylate, 2-ethylhexyl acrylate, n-butyl methacrylate, isobutyl methacrylate, tert-butyl methacrylate, n-hexyl methacrylate, 2-ethylhexyl methacrylate, methacrylic acid and mixtures thereof. Most preferably, the carbosiloxane rich stage comprises: 0 to 90 wt % (preferably, 10 to 50 wt %; more preferably, 12.5 to 30 wt %; still more preferably, 15 to 25 wt %; most preferably, 19 to 21 wt %), based on weight of the carbosiloxane rich stage, of structural units of a vinyl monomer; wherein the vinyl monomer includes methyl methacrylate and methacrylic acid.

Preferably, the carbosiloxane rich stage comprises: 10 to 100 wt % (preferably, 50 to 90 wt %; more preferably, 70 to 87.5 wt %; still more preferably, 75 to 85 wt %; most preferably, 79 to 81 wt %), based on weight of the carbosiloxane rich stage, of structural units of a carbosiloxane monomer of formula (I). More preferably, the carbosiloxane rich stage comprises: 10 to 100 wt % (preferably, 50 to 90 wt %; more preferably, 70 to 87.5 wt %; still more preferably, 75 to 85 wt %; most preferably, 79 to 81 wt %), based on weight of the carbosiloxane rich stage, of structural units of a carbosiloxane monomer of formula (I), wherein a is 0 to 3 (preferably, 0 to 2; most preferably, 1); wherein d is 0 or 1 (preferably, 0); wherein each $R^1$ is independently selected from the group consisting of a hydrogen, a $C_{1-10}$ alkyl group and an aryl group (preferably, a hydrogen and a $C_{1-10}$ alkyl group; more preferably, a hydrogen and a $C_{1-4}$ alkyl group; still more preferably, a hydrogen and a methyl group; most preferably, a methyl group); wherein each $R^2$ is independently selected from the group consisting of a hydrogen and a $C_{1-10}$ alkyl group (preferably, a hydrogen and a Cis alkyl group; more preferably, a hydrogen and a $C_{1-4}$ alkyl group; still more preferably, a hydrogen and a methyl group; most preferably, a methyl group); wherein each $R^8$ is a —O—Si(CH$_3$)$_2$—O—Si(CH$_3$)$_3$ group; wherein Y is selected from the group consisting of formula (II), (III) and (IV) (preferably, (II) or (III); most preferably, (II)); wherein each $R^4$ and $R^6$ are independently selected from the group consisting of a hydrogen and a methyl group (preferably, a methyl group); wherein each $R^3$ and $R^5$ are independently a $C_{1-10}$ alkylene group (preferably, a $C_{1-7}$ alkylene group; more preferably, a C2-6 alkylene group; still more preferably, a $C_{3-5}$ alkylene group; most preferably, a C3 alkylene group); wherein each $R^7$ is independently a $C_{1-10}$ alkyl group; wherein b is 0 to 4 and wherein c is 0 or 1. Most preferably, the carbosiloxane rich stage comprises: 10 to 100 wt % (preferably, 50 to 90 wt %; more preferably, 70 to 87.5 wt %; still more preferably, 75 to 85 wt %; most preferably, 79 to 81 wt %), based on weight of the carbosiloxane rich stage, of structural units of a carbosiloxane monomer of formula (I), wherein a is 1; wherein d is 0; wherein each $R^1$ is a methyl group; wherein each $R^2$ is a methyl group; wherein Y is of formula (II); wherein each $R^3$ is a $C_{3-5}$ alkylene group; and wherein each $R^4$ is a methyl group.

Preferably, the composition of the present invention comprises a multistage polymer of the present invention. More preferably, the composition of the present invention comprises: 0.1 to 10 wt % (preferably, 0.5 to 7.5 wt %; more preferably, 1 to 7 wt %; still more preferably, 3 to 5 wt %; most preferably, 3.5 to 4.5 wt %) of a multistage polymer of the present invention. Most preferably, the composition of the present invention comprises: 0.1 to 10 wt % (preferably, 0.5 to 7.5 wt %; more preferably, 1 to 7 wt %; still more preferably, 3 to 5 wt %; most preferably, 3.5 to 4.5 wt %) of a multistage polymer of the present invention; wherein the multistage polymer, comprising an acrylate rich stage and a carbosiloxane rich stage.

Preferably, composition of the present invention is selected from the group consisting of a personal care formulation (e.g., hair care formulation, a skin care formulation, a sun care formulation, a nail care formulation, a pet care formulation, an antiperspirant/deodorant formulation, a color cosmetic formulation); a home care formulation; a coating; an oilfield servicing fluid; a civil engineering servicing fluid; a construction formulation and a pharmaceutical formulation.

Preferably, composition of the present invention, further comprises a carrier. More preferably, the composition of the present invention, comprises 0.1 to 99.9 wt % (preferably, 10 to 95 wt %; more preferably, 25 to 90 wt %; more preferably, 40 to 80 wt %), based on weight of the composition, of a carrier. Most preferably, the composition of the present invention, comprises 0.1 to 99.9 wt % (preferably, 10 to 95 wt %; more preferably, 25 to 90 wt %; more preferably, 40 to 80 wt %), based on weight of the composition, of a carrier; wherein the multistage polymer is dispersed in the carrier.

Preferably, composition of the present invention, further comprises 0.1 to 99.9 wt % (preferably, 10 to 95 wt %; more preferably, 25 to 90 wt %; more preferably, 40 to 80 wt %), based on weight of the composition, of a carrier is selected from the group consisting of water; emulsions (e.g., oil-in-water emulsion, water-in-oil emulsion); alcohols (e.g., $C_{1-4}$ straight or branched chain alcohols such as ethyl alcohol, propyl alcohol, isopropyl alcohol, butyl alcohol); glycols (e.g., ethylene glycol, propylene glycol, butylene glycol, pentylene glycol, hexylene glycol, dipropylene glycol, ethoxydiglycol); glycerin; butyl cellosolve and mixtures thereof. More preferably, the composition of the present invention, comprises 0.1 to 99.9 wt % (preferably, 10 to 95 wt %; more preferably, 25 to 90 wt %; more preferably, 40 to 80 wt %), of a carrier; wherein the carrier includes water.

Preferably, the composition of the present invention is a personal care formulation. More preferably, the composition of the present invention is a personal care formulation selected from the group consisting of a hair care formulation, a skin care formulation, a sun care formulation, a nail care formulation, a pet care formulation, an antiperspirant/deodorant formulation and a color cosmetic formulation. Preferably, the composition of the present invention is a personal care formulation selected from the group consisting of a hair care formulation, a skin care formulation, a sun care formulation, a nail care formulation, a pet care formulation, an antiperspirant/deodorant formulation and a color cosmetic formulation; wherein the personal care formulation further comprises a cosmetically acceptable carrier; wherein the cosmetically acceptable carrier is selected to be capable of evaporating upon application of the personal care formulation to mammalian skin and/or hair.

Preferably, the composition of the present invention is a personal care formulation, wherein the personal care formulation further comprises at least one personal care active selected from the group consisting of a water proofing agent, an emollient, a preservative, an antioxidant, a fragrance, a deodorant, an antiperspirant active, a skin coolant, a humectant, a rheology modifier, an aesthetic modifier, a vitamin, a skin protectant, an oil, an emulsifier, a surfactant, a pearlizer, a consistency factor, a thickener, a super fatting agent, a stabilizer, a polymer, a silicone oil, a fat, a wax, a lecithin, a phospholipid, a filler, a light management powder or particle, a moisturizer, a cleanser, a sun care active, a hair treatment active, an anti-dandruff agent, a colorant and a skin care active.

Preferably, the composition of the present invention is a coating. More preferably, the composition of the present invention is a coating, wherein the coating, further comprises at least one coating component selected from the group consisting of a film forming binder, an opacifier, a pigment, a rheology modifier, a wetting agent and a metal oxide.

Preferably, the composition of the present invention is a home care formulation. More preferably, the composition of the present invention is a home care formulation, wherein the home care formulation, further comprises at least one home care active ingredient selected from the group consisting of a fragrance, an inset repellent, a deodorizer, a cleaning agent, a disinfecting agent, a laundry detergent, a laundry softening agent, a dishwashing detergent, a toilet bowl cleaning agent, a fabric sizing agent, a lubricating agent and a textile wipe.

Preferably, the composition of the present invention is an oilfield servicing fluid. More preferably, the composition of the present invention is an oilfield servicing fluid, wherein the oilfield servicing fluid, further comprises at least one of a clay, a xanthan gum, a starch, a polymer, an acid soluble carbonate salt, a sodium chloride and a rheology modifier.

Preferably, the composition of the present invention is a construction formulation. More preferably, the composition of the present invention is a construction formulation, wherein the construction formulation, further comprises at least one of a cement, a concrete, an adhesive, a plaster, a mortar, a joint compound, a clay and a mica.

Preferably, the composition of the present invention is a pharmaceutical formulation. More preferably, the composition of the present invention is a pharmaceutical formulation; wherein the pharmaceutical formulation further comprises a pharmaceutically acceptable carrier; wherein the pharmaceutically acceptable carrier is selected to be capable of evaporating upon application of the pharmaceutical formulation to mammalian tissue or hair.

Preferably, the composition of the present invention is a pharmaceutical formulation, wherein the pharmaceutical formulation, further comprises at least one of an excipient, a biological active, a tableting material, an inactive ingredient, a binding agent, a time release agent, a flavoring agent and a colorant.

The multistage polymer of the present invention can be prepared by conventional polymerization techniques, such as, for example, by emulsion polymerization. Aqueous emulsion polymerization processes are typically conducted in an aqueous reaction mixture, which contains at least one monomer and various synthesis adjuvants, such as free radical sources, buffers, chain transfer agents and reductants in an aqueous reaction medium. Preferably, the multistage polymer of the present invention is an emulsion polymer.

Some embodiments of the present invention will now be described in detail in the following Examples.

The monomer abbreviations used in the Examples are described in TABLE 1.

TABLE 1

| Abbreviation | Monomer |
| --- | --- |
| BA | Butyl Acrylate |
| BMA | Butyl Methacrylate |
| IBMA | Isobutyl Methacrylate |
| EHA | 2-Ethylhexyl Acrylate |
| EHMA | 2-Ethylhexyl Methacrylate |
| MMA | Methyl Methacrylate |
| MAA | Methacrylic Acid |
| ALMA | Allyl Methacrylate |
| MD'M-ALMA | (structure) |
| M'DM-IPMA | (structure) |

Comparative Example CS1: Single Stage Polymer

A 1-liter round-bottom flask equipped with an overhead stirrer, thermocouple, condenser and inlets for the addition of monomer and initiators was charged with deionized water (150.0 g), sodium dodecyl sulfonate surfactant (3.3 g of a 23% DS-4) and sodium carbonate (1.1 g). The flask contents were then stirred and heated at 85° C. A monomer emulsion was prepared by charging deionized water (81.1 g) and sodium dodecyl sulfonate surfactant (3.1 g of 23% DS-4) to a container and set to stir. After the surfactant was incorporated into the water, butyl acrylate (BA)(50 g), ethylhexyl acrylate (EHA)(100 g), methyl methacrylate (MMA)(96.3 g), methacrylic acid (MAA)(3.8 g) and allyl methacrylate (ALMA)(0.2 g) were added slowly to the stirring mixture in the container. A cofeed catalyst solution was also prepared by charging sodium persulfate (0.25 g) and deionized water (22 g) in another container. When the flask contents reached a temperature of 85° C., 10 g of the above prepared monomer emulsion was charged to the flask, followed with a deionized water rinse (10 g) water rinse, followed by an initiator solution of sodium persulfate (0.9 g) in deionized water (5.7 g). After initial polymerization and at 85° C., a monomer emulsion cofeed to the flask of the above prepared monomer emulsion was begun at a rate of 1.97 g/min for 15 minutes and then at a rate of 3.93 g/min. for the next 75 minutes. Simultaneously, with the monomer emulsion cofeed the catalyst cofeed was begun at a rate of 0.24 g/min for 92 minutes. At the completion of the cofeeds, the flask contents were chased to reduce the amount of residual monomers to provide the product single stage polymer.

Comparative Example CS2: Dendritic Silicone-Grafted Vinyl Copolymer

A flask equipped with an overhead stirrer, thermocouple, condenser and inlets for the addition of monomer and initiators was charged with carbosiloxane dendrimer (150 parts) with the following structure

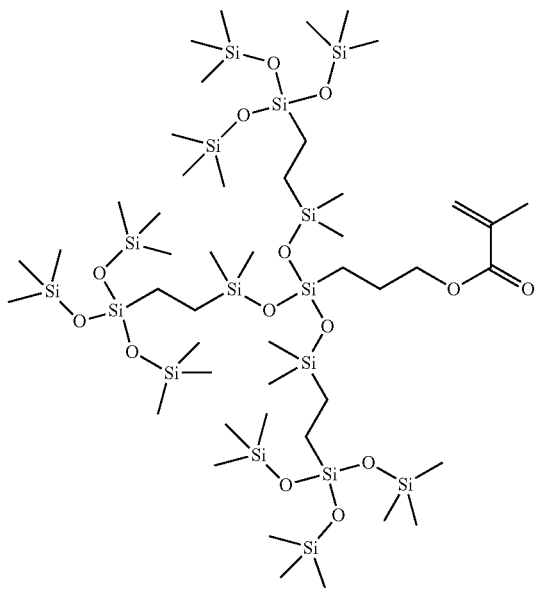 [SMILES: C=C(C)C(=O)OCCC[Si](O[Si](C)(C)CC[Si](O[Si](C)(C)C)(O[Si](C)(C)C)O[Si](C)(C)C)(O[Si](C)(C)CC[Si](O[Si](C)(C)C)(O[Si](C)(C)C)O[Si](C)(C)C)O[Si](C)(C)CC[Si](O[Si](C)(C)C)(O[Si](C)(C)C)O[Si](C)(C)C]

methyl methacrylate (MMA)(99 parts), n-butyl methacrylate (BMA)(51 parts) and 2-phenoxyethanol (9 parts). To the flask contents was then was added laureth-1 phosphate (7 parts), sodium hydroxide solution (4 parts, 20%) and deionized water (676 parts). The flask contents were then emulsified and dispersed using a homogenizer. The flask contents were then heated to 80° C., under a nitrogen. Upon reaching temperature, potassium persulfate (2.2 parts) was added to the flask contents while maintaining the temperature controller at 80° C. After three hours after the potassium persulfate addition, 2,2'-azobis[N-(2-carboxyethyl)-2-methylpropionamidine] tetrahydrate (2.2 parts) was added to the flask contents while maintaining the temperature controller at 80° C. The flask contents were allowed to stir for three additional hours while maintaining the temperature controller at 80° C., to provide the product dendritic silicone-grafted vinyl copolymer.

Example S1: Multistage Polymer

A 2-liter round-bottom flask (equipped with an overhead stirrer, thermocouple, condenser and inlets for the addition of monomer and initiators) was charged with deionized water (252.0 g), 50% CAVASOL™ W7 MTL (cyclodextrin from Wacker Fine Chemicals) (5.3 g), 23% DS-4 surfactant (5.3 g) (A-16-22 from Stepan) and sodium carbonate (1.8 g). The flask contents were stirred and heated to 85° C.

An acrylate rich monomer emulsion was prepared by charging deionized water (103.8 g) and 23% DS-4 surfactant (4.0 g) to a first container and set to stir. Once the surfactant was incorporated into the water the following monomers were added slowly to the first container with continued stirring: BA (64 g), EHA (128.0 g), MMA (123.2 g), methyl acrylic acid MAA (4.8 g) and ALMA (0.24 g).

A carbosiloxane rich monomer emulsion was prepared by charging deionized water (26.0 g) and 23% DS-4 surfactant (1.0 g) to a second container and set to stir. Once the surfactant was incorporated into the water the following monomers were added slowly to the second container with continued stirring: MD'M-ALMA (64 g), MMA (14.8 g) and MAA (1.2 g). The carboxiloxane rich monomer emulsion was further emulsified using the homogenization at 10 K rpm for 10 min.

A cofeed catalyst solution was prepared containing sodium persulfate (0.8 g) and deionized water (35.2 g).

A cofeed buffer solution was prepared containing sodium carbonate (0.8 g) and deionized water (35.2 g).

At a reaction set point temperature of 85° C., 12.8 g of the acrylate rich monomer emulsion from the first container along with a deionized water rinse (16.0 g) was charged to the flask contents. An initiator solution of sodium persulfate (1.8 g) in deionized water (12.0 g) was then added to the flask contents. After the initial polymerization, the remainder of the acrylate rich monomer emulsion in the first container was cofeed to the flask contents at a rate of 3.08 g/min. for 15 minutes and then at 6.15 g/min for 60 minutes. Simultaneously with the acrylate rich monomer emulsion cofeed, the cofeed catalyst solution and the cofeed buffer solution were added to the reactor contents at a rate of 0.39 g/min. for 92 minutes.

Following the addition of the acrylate rich monomer emulsion, the carbosiloxane rich monomer emulsion in the second container was added to the reactor contents at a rate of 7.23 g/min for 15 minutes. After completion of the various feeds, the contents of the flask were chased to reduce the amount of residual monomers, providing the product multistage polymer.

Example S2: Multistage Polymer

The multistage polymer of Example S2 was prepared in the same fashion as the multistage polymer of Example S1 except that the carbosiloxane rich monomer emulsion was added to the flask contents as a shot. After addition, the reaction mixture was held steady with stirring at 85° C. for 20 minutes. At the end of the hold time, catalyst and buffer co-feed was restarted. At the completion of catalyst cofeed, the flask contents were chased to reduce the amount of residual monomers, providing the product multistage polymer.

Examples S3-S19: Multistage Polymer

Multistage polymers were prepared substantially as described in Example S1 the appropriate changes being made reflecting the total wt % of the acrylate rich stage and the carbosiloxane rich stage in the respective multistage polymers of Examples S3-S19 with the acrylate rich stage monomers and the carbosiloxane rich stage monomers in the respective stages as noted in TABLE 2.

TABLE 2

Multistage polymer

| | Acrylate rich stage | | | | | | | | Carbosiloxane rich stage | | | |
|---|---|---|---|---|---|---|---|---|---|---|---|---|
| | Total | Monomer (wt %) | | | | | | | Total | Monomer (wt %) | | |
| Ex. | wt % | BA | BMA | IBMA | EHA | EHMA | MMA | MAA | ALMA | wt % | MAA | MMA | MD'M-ALMA | MD'M-IPMA |
| S1 | 80 | 20 | — | — | 40 | — | 38.5 | 1.5 | 0.075 | 20 | 1.5 | 18.5 | 80 | — |
| S2 | 80 | 20 | — | — | 40 | — | 38.5 | 1.5 | 0.075 | 20 | 1.5 | 18.5 | 80 | — |
| S3 | 90 | 20 | — | — | 40 | — | 38.5 | 1.5 | 0.075 | 10 | 1.5 | 18.5 | 80 | — |
| S4 | 70 | 20 | — | — | 40 | — | 38.5 | 1.5 | 0.075 | 30 | 1.5 | 18.5 | 80 | — |
| S5 | 80 | 20 | — | — | 40 | — | 38.5 | 1.5 | 0.075 | 20 | 1.5 | 33.5 | 65 | — |
| S6 | 80 | — | — | — | 40 | — | 58.5 | 1.5 | 0.075 | 20 | 1.5 | 18.5 | 80 | — |
| S7 | 80 | 20 | — | — | — | — | 78.5 | 1.5 | 0.075 | 20 | 1.5 | 18.5 | 80 | — |
| S8 | 80 | 20 | — | — | 40 | — | 38.5 | 1.5 | 0.075 | 20 | 1.5 | 18.5 | — | 80 |
| S9 | 80 | — | 20 | — | 40 | — | 38.5 | 1.5 | 0.075 | 20 | 1.5 | 18.5 | 80 | — |
| S10 | 80 | — | — | 20 | 40 | — | 38.5 | 1.5 | 0.075 | 20 | 1.5 | 18.5 | 80 | — |
| S11 | 70 | — | 20 | — | 40 | — | 38.5 | 1.5 | 0.075 | 30 | 1.5 | 18.5 | 80 | — |
| S12 | 70 | — | — | 20 | 40 | — | 38.5 | 1.5 | 0.075 | 30 | 1.5 | 18.5 | 80 | — |
| S13 | 80 | 20 | — | — | — | 40 | 38.5 | 1.5 | 0.075 | 20 | 1.5 | 18.5 | 80 | — |
| S14 | 70 | 20 | — | — | — | 40 | 38.5 | 1.5 | 0.075 | 30 | 1.5 | 18.5 | 80 | — |
| S15 | 70 | 50 | 23.5 | — | — | — | 25 | 1.5 | 0.075 | 30 | 1.5 | 18.5 | 80 | — |
| S16 | 70 | 40 | 33.5 | — | — | — | 25 | 1.5 | 0.075 | 30 | 1.5 | 18.5 | 80 | — |
| S17 | 80 | 40 | 33.5 | — | — | — | 25 | 1.5 | 0.075 | 20 | 1.5 | 18.5 | 80 | — |
| S18 | 80 | 30 | 43.5 | — | — | — | 25 | 1.5 | 0.075 | 20 | 1.5 | 18.5 | 80 | — |
| S19 | 80 | 20 | 53.5 | — | — | — | 25 | 1.5 | 0.075 | 20 | 1.5 | 18.5 | 80 | — |

Example S20: Multistage Polymer

A 4-neck 3 L glass reactor equipped with a condenser, overhead mixing, heating mantle and nitrogen sweep was charged with deionized water (500 g) and a 29 wt % solution of sodium lauryl sulfate (10 g)(i.e., Polystep® B-5-N available from Stepan Company)(hereinafter "SLS"). A monomer emulsion of deionized water (600 g), SLS (60 g), butyl acrylate (550 g), methyl methacrylate (450 g), methacrylic acid (10 g) and n-dodecyl mercaptan (20 g) was formed with overhead agitation using an IKA mixer. After heating the reactor contents to 88° C., 17.5 g of the monomer emulsion and a solution of ammonium persulfate (0.3 g) in deionized water (20 g) were added to the reactor. The rest of the monomer emulsion and a solution of ammonium persulfate (1.05 g) in deionized water (80 g) water were then fed to the reactor over 2 hours while maintaining the reactor temperature at 88° C. The reactor was held at 88° C. for 30 minutes following the monomer emulsion addition. Then the reactor contents were cooled to 60° C. Then a mixture of SLS (0.2 g), an 85 wt % aqueous tert-amyl hydroperoxide (10 g)(i.e., Luperox® TAH 85 initiator available from Arkema)(hereinafter "TAH") and deionized water (10 g) was added to the reactor contents followed by the addition of a mixture of isoascorbic acid (0.5 g), a 0.15 wt % aqueous solution of iron (II) sulfate (11.5 g) and deionized water (10 g). The reactor contents were then cooled to room temperature and neutralized to pH 7 using an aqueous ammonium hydroxide solution. The product latex mixture was filtered through mesh screens and recovered.

A 4-neck 500 mL glass reactor equipped with a condenser, overhead mixing, heating mantle and a nitrogen sweep was then charged with a portion of the recovered product latex mixture (100 g), deionized water (10 g), an antifoulant (0.2 g)(i.e., Actrene™ antifoulant available from Ecolab). A monomer emulsion of MD'M-ALMA (11.75 g), SLS (0.85 g) and deionized water (12.82 g) was formed by overhead agitation using an IKA mixer followed by further agitation using a small handheld rotor stator to produce 2-15 micron droplet size. After heating the reactor contents to 70° C., the monomer emulsion was added to the reactor contents, which were then maintained at 70° C. for 1 hour. Then, a mixture of isoascorbic acid (0.1 g), a 1 wt % solution of ethylene diamine tetra acetic acid (0.1 g)(i.e., Versene™ available from Thermo Fisher Scientific), a 0.15 wt % iron (II) sulfate solution (1.2 g) and deionized water (9.6 g) and a mixture of SLS (0.02 g), TAH (0.16 g) and deionized water (10 g) were fed to the reactor simultaneously over 90 minutes while maintaining the reactor at 70° C. After the end those feeds, the reactor was maintained at 70° C. for 30 minutes, before cooling to 60° C. Then a mixture of isoascorbic acid (0.1 g) and deionized water (10 g) and a mixture of SLS (0.04 g), TAH (0.19 g) and deionized water (10 g) were added to the reactor contents sequentially. Then two drops of 50 wt % ammonium hydroxide solution was added to bring the final pH of the reactor contents close to neutral. The final reaction mixture was then filtered through mesh screens, providing the product multistage polymer.

Comparative Example CS3 and Examples S21-S30: Multistage Polymer

Multistage polymers were prepared substantially as described in Example S20 with appropriate changes being made reflecting the total wt % of the acrylate rich stage and the carbosiloxane rich stage in the respective product multistage polymers of Comparative Example CS3 and Examples S21-S30 with the acrylate rich stage monomers and the carbosiloxane rich stage monomers in the respective stages as noted in TABLE 3.

box, the films were allowed to air dry in an environmental controlled room (72° F. and 50% RH) at least 24 hours before making measurements. Both water and sebum contact angles were measured at 4 seconds and at 250 seconds after water or sebum droplets were deposited on the substrate using a drop shape analyzer (Kruss DSA100). For the sebum contact angle measurement, an artificial sebum solution was prepared having the composition noted in TABLE 5. The results of the water and sebum contact angle measurements are provided in TABLE 4.

TABLE 3

| | Multistage polymer | | | | | | | |
|---|---|---|---|---|---|---|---|---|
| | Acrylate rich stage | | | | Carbosiloxane rich stage | | | |
| | Total | Monomer (wt %) | | | Total | Monomer (wt %) | | |
| Ex. | wt % | BA | MMA | MAA | wt % | MAA | MMA | BA | MD'M-ALMA |
| CS3 | 67 | 54.5 | 44.5 | 1 | 33 | — | 45 | 55 | 0 |
| S20 | 67 | 54.5 | 44.5 | 1 | 33 | — | — | — | 100 |
| S21 | 67 | 54.5 | 44.5 | 1 | 33 | — | 25 | — | 75 |
| S22 | 67 | 54.5 | 44.5 | 1 | 33 | — | 45 | — | 55 |
| S23 | 67 | 54.5 | 44.5 | 1 | 33 | — | 45 | 18.7 | 36.3 |
| S24 | 67 | 54.5 | 44.5 | 1 | 33 | — | 45 | 36.8 | 18.2 |
| S25 | 67 | 54.5 | 44.5 | 1 | 33 | 4 | 43.2 | — | 52.8 |
| S26 | 80 | 54.5 | 44.5 | 1 | 20 | — | 45 | — | 55 |
| S27 | 89 | 54.5 | 44.5 | 1 | 11 | — | 45 | — | 55 |
| S28 | 67 | 54.5 | 44.5 | 1 | 33 | 0.5 | 44.7 | — | 54.8 |
| S29 | 67 | 54.5 | 44.5 | 1 | 33 | 1 | 44.5 | — | 54.5 |
| S30 | 67 | 54.5 | 44.5 | 1 | 33 | 2 | 43.2 | — | 52.8 |

Polymer Properties

The product multistage polymers prepared according to Comparative Examples CS1, CS3 and Examples S1-S30 were analyzed for percent solids, pH, mean particle size (using Brookhaven Instruments BI-90 particle size analyzer) and glass transition temperature, Tg, as measured using a TA instruments model 2920 Differential Scanning calorimeter (DSC). The results are provided in TABLE 4.

Water and Sebum Repellency

Water and sebum repellency of a film are dominated by surface energy. High water and sebum repellency for a prolonged period is desired in a variety of applications, such as, for architectural coatings and for personal care applications (e.g., providing long lasting active deposition and rub-off resistance benefits, especially in color cosmetics, sunscreens and anti-pollution products). The water and sebum repellency can be evaluated by measuring the water contact angle and sebum contact angle from the surface of a film. Specifically, films were prepared from the product multistate polymers prepared according to Comparative Example CS1-CS3 and Examples S1-S30 by drawdown with a 3 mil or 6 mil doctor blade on LENETA P121-16 black plastic chart. The drawn films were allowed to air dry in an environmental controlled room (72° F. and 50% RH) for at least 72 hours. The dried films were then placed into a fog box for at least 48 hours to remove any residual surfactants from the film surface. After treatment in the fog

TABLE 4

| | | | | | Contact angle | | | |
|---|---|---|---|---|---|---|---|---|
| | | | PS | Tg | Water | | Sebum | |
| Example | % solids | pH | (nm) | (° C.) | 4 s | 250 s | 4 s | 250 s |
| CS1 | 41.04 | 5.87 | 117.1 | −10 | 73.1 | 68.7 | 19.4 | 10.4 |
| CS2 | — | — | — | — | 113.8 | 112.2 | 75.8 | 65.8 |
| CS3 | 31.9 | 7.51 | 105.1 | 2.2 | 68.5 | 62.9 | 20.0 | 4.6 |
| S1 | 43.38 | 5.60 | 145.2 | −7.6 | 91.5 | 87.1 | 58.4 | 54.6 |
| S2 | 39.36 | 5.77 | 201.5 | −12.3 | 87.0 | 83.3 | 57.3 | 54.7 |
| S3 | 39.41 | 5.87 | 122.1 | −7.5 | 86.7 | 82.0 | 53.7 | 48.3 |
| S4 | 38.90 | 5.74 | 130.4 | −8.9 | 82.4 | 78.1 | 58.9 | 57.7 |
| S5 | 38.06 | 5.74 | 139.0 | −11.6 | 80.0 | 75.8 | 53.5 | 51.9 |
| S6 | 39.37 | 5.77 | 126.5 | 28.5 | 86.6 | 82.3 | 45.0 | 40.5 |
| S7 | 40.65 | 5.72 | 153.0 | 77.4 | 103.8 | 100.6 | 19.5 | 20.1 |
| S8 | 38.52 | 5.63 | 148.9 | −11.4 | 96.7 | 94.7 | 52.6 | 32.1 |
| S9 | 37.62 | 5.37 | 138.9 | 7.2 | 98.5 | 95.8 | 45.0 | 32.1 |
| S10 | 39.71 | 5.60 | 137.8 | 15.3 | 97.7 | 95.1 | 41.8 | 27.3 |
| S11 | 39.08 | 5.62 | 136.1 | 5.8 | 97.8 | 96.3 | 49.9 | 38.8 |
| S12 | 38.44 | 5.56 | 128.9 | 15.3 | 95.3 | 93.9 | 48.8 | 37.6 |
| S13 | 37.65 | 5.56 | 130.4 | 24.2 | 83.8 | 81.0 | 41.2 | 40.5 |
| S14 | 39.26 | 5.52 | 128.2 | 25.7 | 88.0 | 88.3 | 40.7 | 38.0 |
| S15 | 46.78 | 5.40 | 145.0 | −6.2 | 100.6 | 98.9 | 58.1 | 51.3 |
| S16 | 47.01 | 5.40 | 149.4 | 4.4 | 100.8 | 98.0 | 51.2 | 48.8 |
| S17 | 45.10 | 5.70 | 150.5 | 2.7 | 96.3 | 93.7 | 54.7 | 54.3 |
| S18 | 47.18 | — | 150.4 | 12.8 | 95.6 | 92.2 | 50.2 | 47.1 |
| S19 | 46.36 | — | 146.2 | 25.6 | 94.2 | 92.1 | 46.6 | 46.5 |
| S20 | 27.2 | 7.55 | 101.1 | 0.5 | 85.1 | 80.6 | 76.5 | 63.9 |
| S21 | 27.9 | 7.22 | 101.0 | −1.9 | 80.9 | 75.6 | 67.1 | 65.3 |
| S22 | 31.1 | 7.15 | 107.4 | 3.3 | 86.3 | 81.9 | 50.1 | 50.1 |
| S23 | 31.9 | 6.90 | 105.0 | 2.6 | 85.5 | 81.0 | 48.6 | 47.6 |
| S24 | 31.8 | 7.35 | 108.3 | 4.4 | 80.0 | 75.3 | 42.9 | 42.2 |
| S25 | 33.8 | 6.93 | 105.0 | — | 84.4 | 84.4 | 48.1 | 43.0 |
| S26 | 28.7 | 7.49 | 100.1 | 5.0 | 87.7 | 84.0 | 59.9 | 48.0 |
| S27 | 27.4 | 7.63 | 98.0 | 2.9 | 84.6 | 80.5 | 53.5 | 30.1 |
| S28 | 33.4 | 7.04 | 105.1 | — | 96.4 | 93.4 | 49.5 | 49.0 |

TABLE 4-continued

| | | | | | Contact angle | | | |
| | | | | | Water | | Sebum | |
| | | | PS | Tg | | | | |
| Example | % solids | pH | (nm) | (° C.) | 4 s | 250 s | 4 s | 250 s |
|---|---|---|---|---|---|---|---|---|
| S29 | 33.6 | 6.91 | 106.2 | — | 90.8 | 87.8 | 42.9 | 42.0 |
| S30 | 33.7 | 6.93 | 105.0 | — | 91.4 | 87.6 | 43.2 | 43.0 |

TABLE 5

| Ingredient | Weight % |
|---|---|
| Glyceryl trioleate[1] | 60 |
| Oleic acid[2] | 20 |
| Squalane[3] | 20 |

[1](65% solution) available from Sigma-Aldrich
[2](90% solution) available from Sigma-Aldrich
[3]available from Sigma-Aldrich

We claim:

1. A multistage polymer, comprising:
   (a) an acrylate rich stage comprising:
   88 to 100 wt %, based on weight of the acrylate rich stage, of structural units of a monoethylenically unsaturated non-ionic, acrylate rich stage monomer, wherein the monoethylenically unsaturated non-ionic, acrylate rich stage monomer is selected from the group consisting of $C_{1-22}$ alkyl (meth)acrylates and mixtures thereof;
   0 to 10 wt %, based on weight of the acrylate rich stage, of structural units of a monoethylenically unsaturated carboxylic acid, acrylate rich stage monomer; and
   0 to 2 wt %, based on weight of the acrylate rich stage, of structural units of a multiethylenically unsaturated, acrylate rich stage monomer having at least two ethylenically unsaturated groups per molecule; and
   (b) a carbosiloxane rich stage, comprising:
   0 to 90 wt %, based on weight of the carbosiloxane rich stage, of structural units of a vinyl monomer; and
   10 to 100 wt %, based on weight of the carbosiloxane rich stage, of structural units of a carbosiloxane monomer of formula (I)

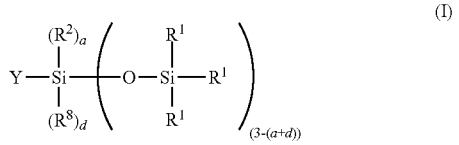

(I)

wherein a is 0 to 3; wherein d is 0 or 1; wherein each $R^1$ is independently selected from the group consisting of a hydrogen, a $C_{1-10}$ alkyl group and an aryl group; wherein each $R^2$ is independently selected from the group consisting of a hydrogen and a $C_{1-10}$ alkyl group; wherein each $R^8$ is a —O—Si(CH$_3$)$_2$—O—Si(CH$_3$)$_3$ group; wherein Y is selected from the group consisting of formula (II), (III) and (IV)

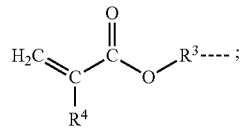

(II)

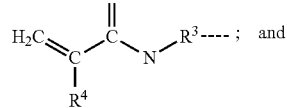

(III)

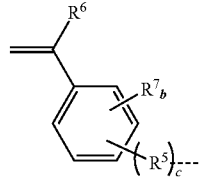

(IV)

wherein each $R^4$ and $R^6$ are independently selected from the group consisting of a hydrogen and a methyl group; wherein each $R^3$ and $R^5$ are independently a $C_{1-10}$ alkylene group; wherein each $R^7$ is independently a $C_{1-10}$ alkyl group; wherein b is 0 to 4 and wherein c is 0 or 1.

2. The multistage polymer of claim 1, further comprising a carrier.

3. The multistage polymer of claim 2, wherein the carrier includes water.

4. A composition, comprising the multistage polymer of claim 3, wherein the composition is selected from the group consisting of a personal care formulation, a home care formulation, a coating, an oilfield servicing fluid, a civil engineering servicing fluid, a construction formulation and a pharmaceutical formulation.

5. The composition of claim 4, wherein the composition is a personal care formulation, wherein the personal care formulation further comprises at least one personal care active selected from the group consisting of a water proofing agent, an emollient, a preservative, an antioxidant, a fragrance, a deodorant, an antiperspirant active, a skin coolant, a humectant, a rheology modifier, an aesthetic modifier, a vitamin, a skin protectant, an oil, an emulsifier, a surfactant, a pearlizer, a consistency factor, a thickener, a super fatting agent, a stabilizer, a polymer, a silicone oil, a fat, a wax, a lecithin, a phospholipid, a filler, a light management powder or particle, a moisturizer, a cleanser, a sun care active, a hair treatment active, an anti-dandruff agent and a skin care active.

6. The composition of claim 4, wherein the composition is a coating, wherein the coating further comprises at least one coating component selected from the group consisting of a film forming binder, anti-sag agents, leveling agents, curing promoters, an opacifier, a pigment, a rheology modifier, a wetting agent and a metal oxide.

7. The composition of claim 4, wherein the composition is a home care formulation, wherein the home care formulation further comprises at least one home care active ingredient selected from the group consisting of a fragrance, an inset repellent, a deodorizer, a cleaning agent, a disinfecting agent, a laundry detergent, a laundry softening agent, a dishwashing detergent, a toilet bowl cleaning agent, a fabric sizing agent, a lubricating agent and a textile wipe.

8. The composition of claim 4, wherein the composition is an oilfield servicing fluid, wherein the oilfield servicing fluid further comprises at least one of a clay, a xanthan gum, a starch, a polymer, an acid soluble carbonate salt, a sodium chloride and a rheology modifier.

9. The composition of claim 4, wherein the composition is a construction formulation, wherein the construction formulation further comprises at least one of a cement, a concrete, an adhesive, a plaster, a mortar, a joint compound, a clay and a mica.

10. The composition of claim 4, wherein the composition is a pharmaceutical formulation, wherein the pharmaceutical formulation, further comprises an excipient, a biological active, a tableting material, an inactive ingredient, a binding agent, a time release agent, a flavoring agent and a colorant.

* * * * *